United States Patent
Heinze et al.

(10) Patent No.: US 6,292,325 B1
(45) Date of Patent: *Sep. 18, 2001

(54) OFFSET GEAR SEGMENT ARM EMPLOYED TO ACCOMMODATE THE MESHING ALIGNMENT IN A TAPE CARTRIDGE-LOADING MECHANISM

(75) Inventors: Robert R. Heinze, San Clemente; William B. Kim, LaHabra, both of CA (US)

(73) Assignee: Seagate Removable Storage Solutions LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,566

(22) Filed: Sep. 1, 1999

Related U.S. Application Data

(60) Provisional application No. 60/136,691, filed on May 28, 1999.

(51) Int. Cl.[7] .................................................. G11B 15/675
(52) U.S. Cl. .............................................................. 360/96.5
(58) Field of Search ............................................ 360/96.5

(56) References Cited

U.S. PATENT DOCUMENTS

| | | | |
|---|---|---|---|
| 4,319,292 | * | 3/1982 | Katoh ................................... 360/96.5 |
| 5,034,830 | * | 7/1991 | Lee ...................................... 360/96.5 |

* cited by examiner

Primary Examiner—Robert S. Tupper
(74) Attorney, Agent, or Firm—McDermitt, Will & Emery

(57) ABSTRACT

A tape cartridge loader includes a substantially flat actuator arm. Rotation of the arm produces a linear motion of a cartridge conveyor. The actuator arm has a sector gear formed around a portion of the periphery of the arm, specifically around the axis of rotation of the arm. The gear is stepped-down with respect to the arm, i.e. such that the centerline of the gear teeth is offset from a plane of the arm (e.g. the plane through the center of the arm). A motor and worm gear apply force to the sector gear to rotate the arm and thereby actuate the conveyor and any other elements of the loader mechanism. The gear offset may cause the force on the arm to generate a moment or torque tending to twist the arm. To compensate for this moment, the loader also includes a guide, positioned to interact with the distal end of the arm during rotation of the arm, so as to limit the twisting of the arm and counteract the torque. The inventive configuration of the arm and gears occupies minimal space within the loader yet provides a particularly durable system for activating the loader.

20 Claims, 9 Drawing Sheets

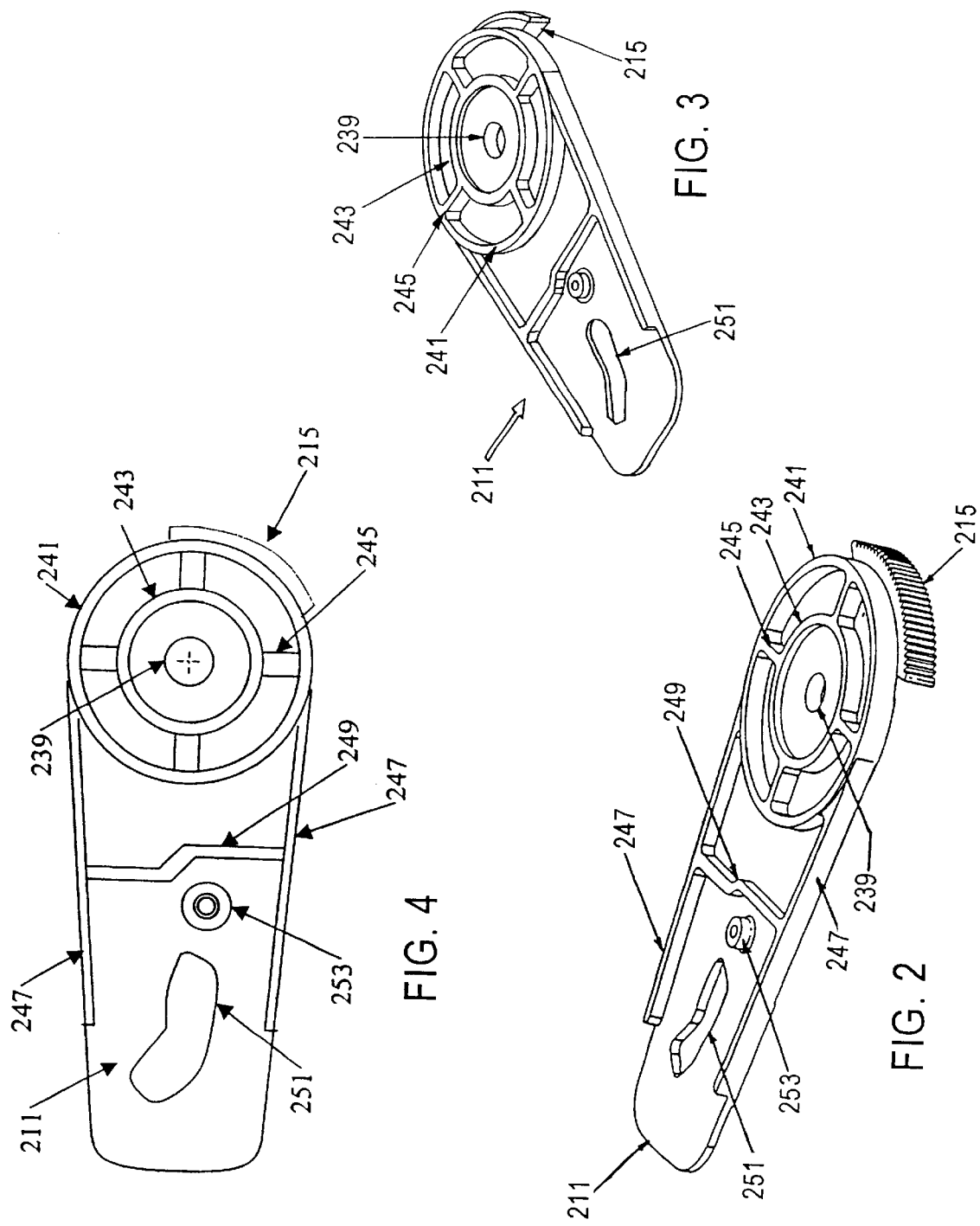

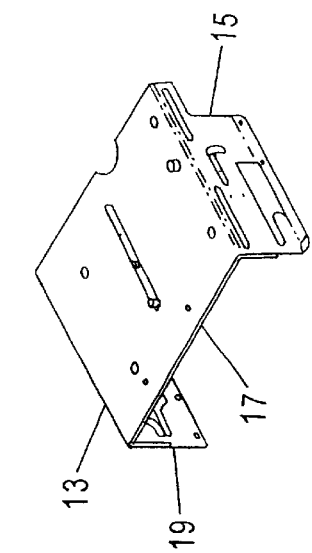
FIG. 5-A
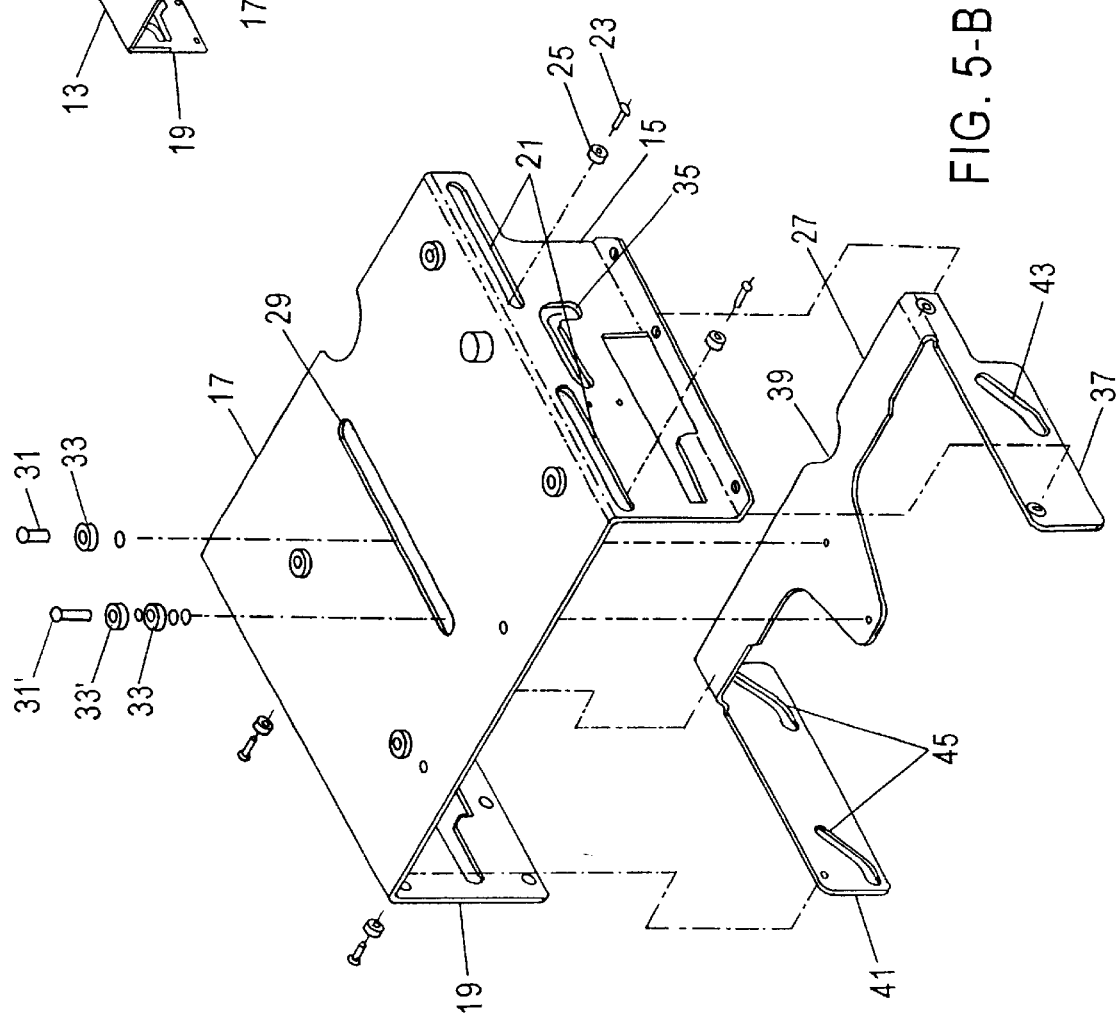
FIG. 5-B

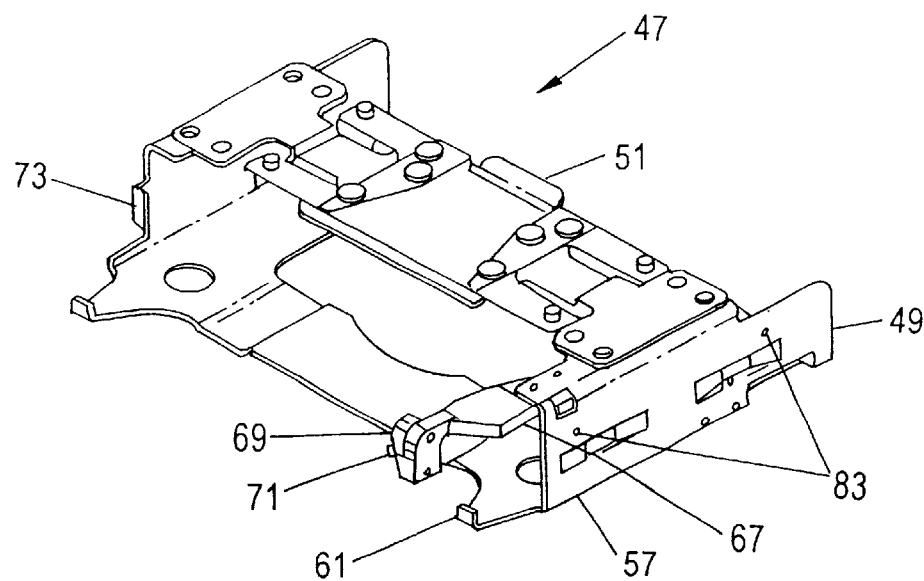
FIG. 6-A
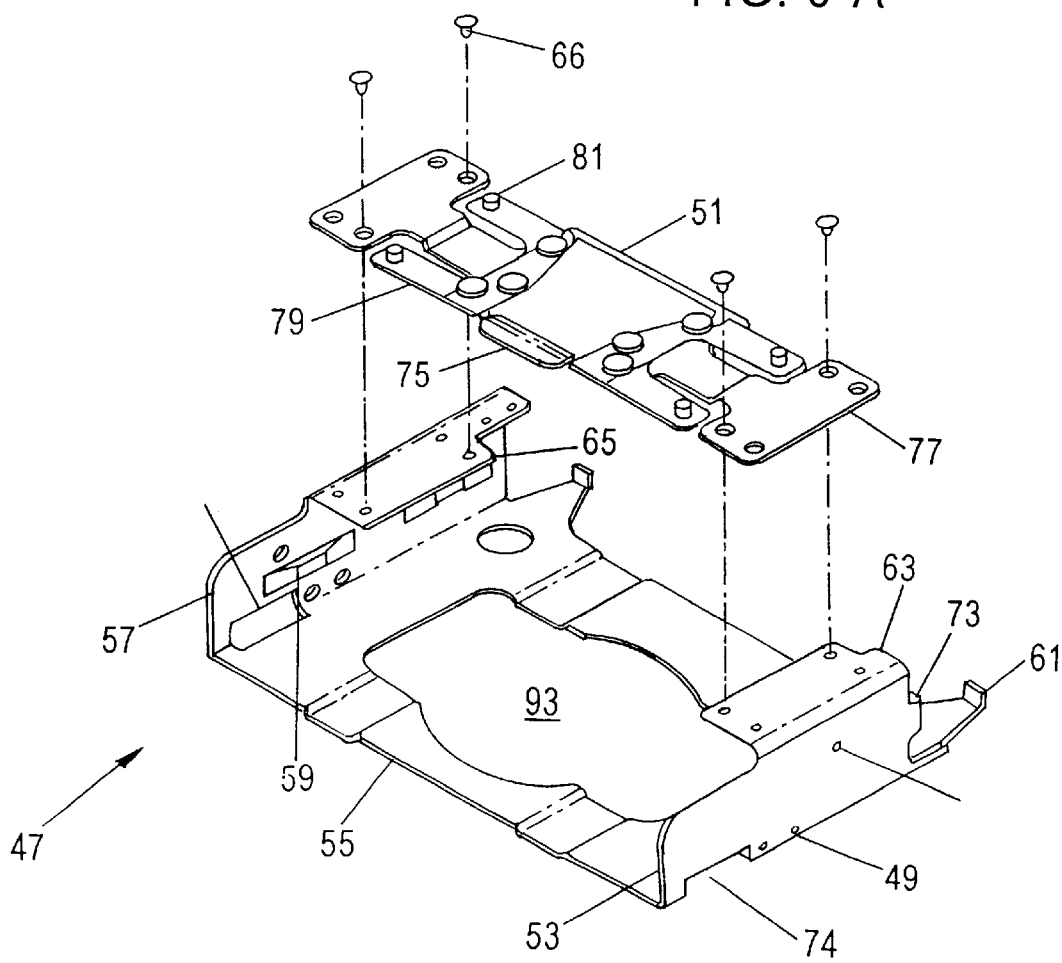
FIG. 6-B

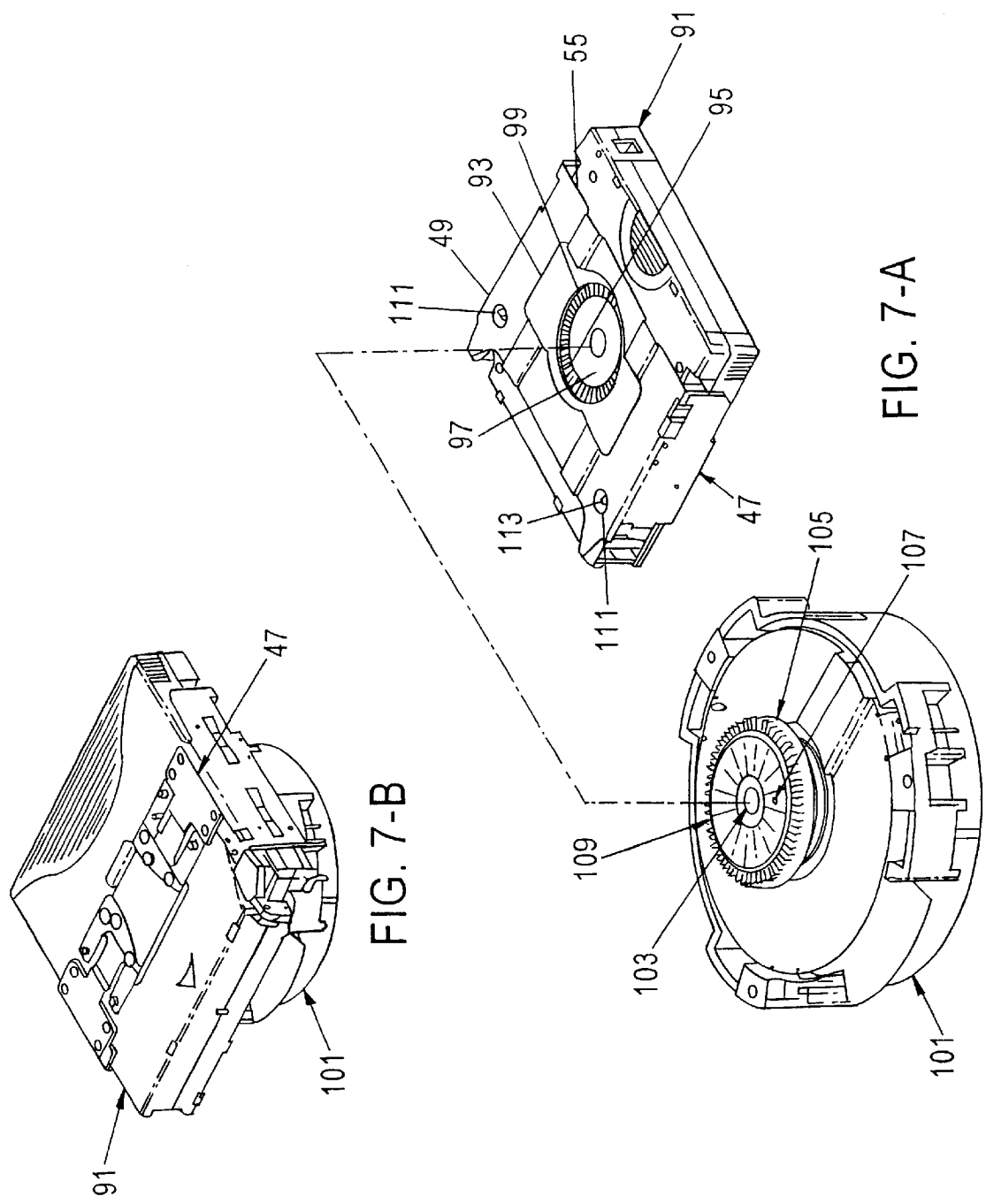

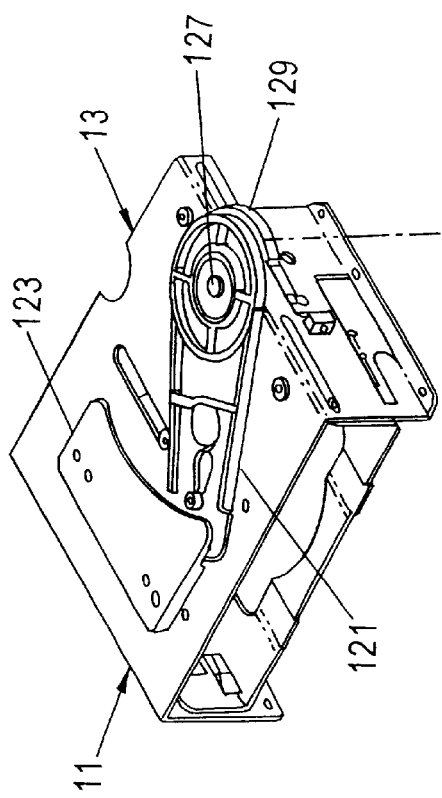
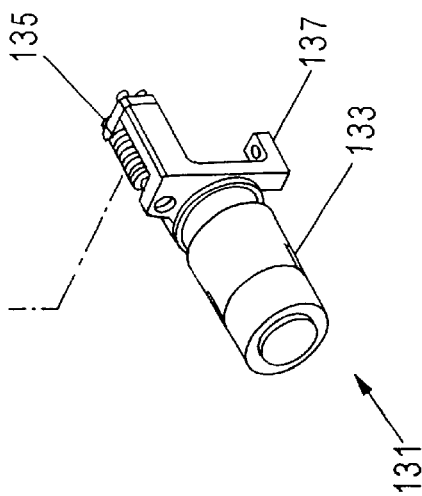
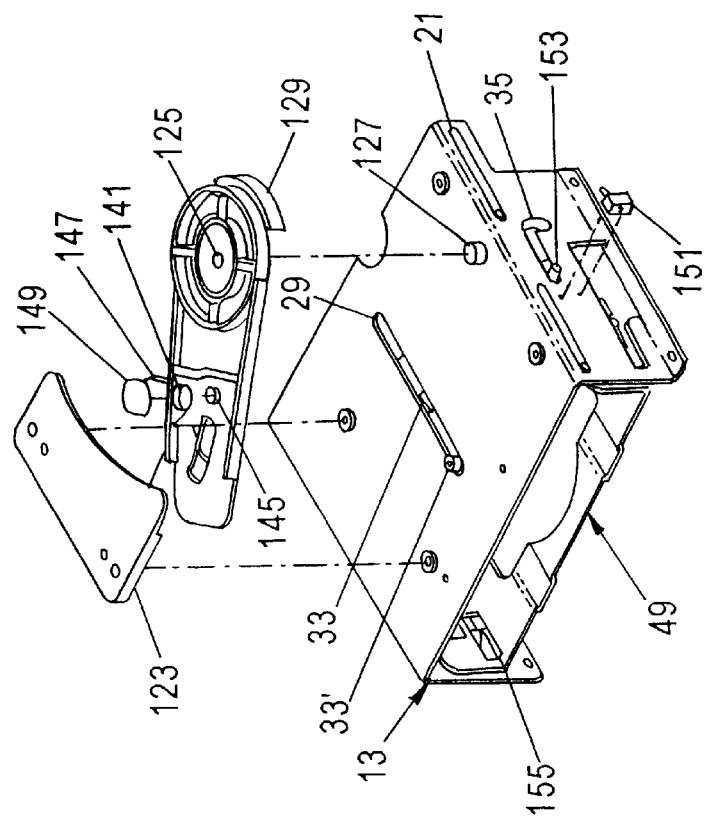
FIG. 8-A
FIG. 8-C
FIG. 8-B

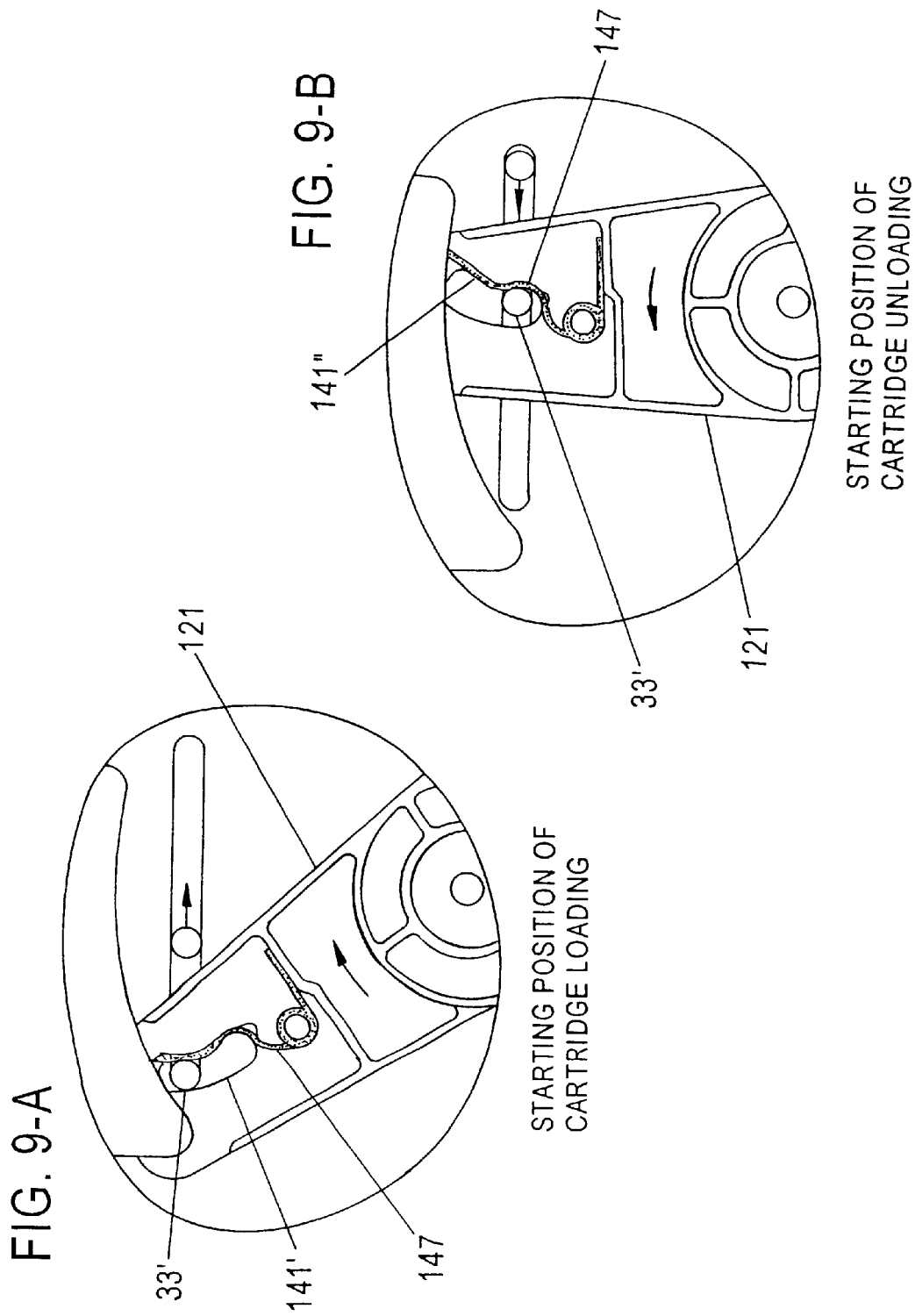

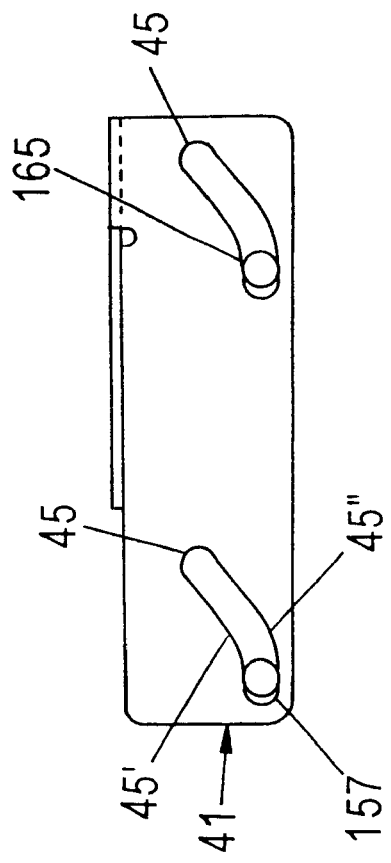
FIG. 10-A
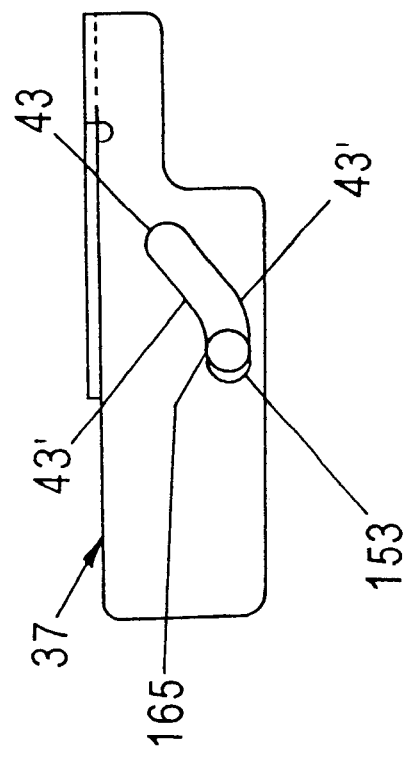
FIG. 10-B

OFFSET GEAR SEGMENT ARM EMPLOYED TO ACCOMMODATE THE MESHING ALIGNMENT IN A TAPE CARTRIDGE-LOADING MECHANISM

RELATED APPLICATIONS

This application claims the benefit of U.S. Provisional Application Ser. No. 60/136,691, entitled "An Offset Gear Segment Arm Employed to Accommodate the Meshing Alignment in the Viper Cartridge Loader" filed on May 28, 1999, by Robert R. Heinze and William B. Kim, the disclosure of which is entirely incorporated herein by reference.

Attention also should be directed to the following commonly assigned applications by William B. Kim.

U.S. patent application Ser. No. 09/314,970 filed May 20, 1999 entitled "Tape Cartridge-Loading Mechanism;" and U.S. patent application Ser. No. 09/314,974 filed May 20, 1999 entitled "Techniques for Compensating for High Initial Unloading Force Requirement in Tape Cartridge-Loading Mechanism."

FIELD OF THE INVENTION

This invention relates to a gear and actuator of a tape cartridge loader mechanism, for example, for a mechanism for loading a single-reel magnetic tape cartridge to and from a tape drive, to enable reading data from and writing data to the tape.

BACKGROUND

Computers utilize a variety of magnetic media devices for the storage of software programs and data. Information recorded on the magnetic medium takes the form of flux transitions that represent the binary "1's" and "0's" that form the digital information. Tape cartridges, such as single-reel tape cartridges, are commonly used in library or other archival data storage applications. In such applications, a user or a robotic mechanism selects a tape cartridge for processing and inserts the cartridge into a tape drive coupled to a computer. In a fully automated system, a mechanism within the tape drive loads the tape from its entry point to a position in which the tape becomes accessible for read-from and write-to operations.

A variety of different size data tape cartridges are available. The drives for the different size cartridges, however, must be substantially the same size, so as to fit within a standard size slot or space available within the framework of a personal computer or the like. Larger cartridges enable storage of more data on the tape within, however, the larger the cartridge the more difficult it is to design a drive mechanism to fit within the design envelope.

For example, some single reel cartridges are 105.4 mm wide, by 102 mm long by 21.5 mm high. Such a cartridge, by itself fills a substantial portion of the design envelope for the tape drive. As a result, tape drives for this type of cartridge have utilized manual loading mechanisms. All movement and operations to load the tape cartridge into the drive, open the tape door for access to the tape leader and engage the tape drive gear to the drive motor gear have been manual in nature. A portion of the cartridge remains outside the drive, even in the fully loaded position, to allow a person to grip a portion of the cartridge to pull the cartridge from the drive.

Data cartridge tape drives have been developed with automatic or "soft" loading and unloading of the cartridge. However, because of the size and complexity of the loading mechanism, these automatic loaders have been used only in drives for smaller tape cartridges.

Also, automatic cartridge tape drives must be able to load and unload cartridges many times without jamming or other failures. A failure of an automatic loader mechanism may damage a tape cartridge, and such a failure makes the drive unusable until repaired or replaced. Typical design parameters for drives available today call for the loader mechanism to continue to operate successfully for at least 300,000 loading/unloading cycles. For applications with frequent cartridge replacement, such as tape library systems providing access to volumes of data to many users via networks, to have a truly useful life each tape loader mechanism must operate successfully with little or no wear for many more cycles than even this design parameter.

Automatic loader mechanisms have been developed in the past that include some form of conveyor to retract the cartridge entirely within the drive and lower the cartridge for engagement with the tape drive motor gear. These mechanisms are motor driven and must include some means to convert the rotational motion of the motor into a complex motion of the conveyor during loading and unloading operations. The mechanisms for actuating the conveyors in such loaders have used complex linkage systems of two or more pivotal members, to achieve the necessary degrees of motion, to load and unload the cartridge. Such linkage systems take up considerable space within the design envelope of the tape drive, making it impossible to design an automatic drive for a relatively large cartridge. Also, such linkage systems are rather fragile. Such a linkage wears quickly and may be damaged by impact, either when the user inserts the cartridge with too much force or due to an external impact on the drive or computer housing.

Also, where the prior mechanisms have utilized gears, the drive gears have been "in-line" with the associated linkages or arms, to transfer motive torque to the cartridge shuttle system. For example, if a gear is in-line with the attached linkage or arm, that is to say in approximately the same plane, the driving of the linkage or arm provides efficient conversion to torque on the linkage or arm, without imparting any moment of force in any direction that is out of the plane. While such gears are generally effective, the in-line arrangement occupies excessive space.

It should, therefore, be appreciated that a need exists for an automatic loading mechanism for data tape cartridges that takes up the minimum amount of space within the design envelope of the tape drive, to allow the mechanism and the drive to handle as large a cartridge as possible. Also, a need exists for a loader mechanism of this type that is particularly durable and can operate successfully for a large number of loading/unloading cycles without any jams or other failures.

SUMMARY OF THE INVENTION

The present inventions meet the above-stated needs and overcome the problems with prior cartridge loader systems.

A tape cartridge loader in accord with a first aspect of the invention includes a loader means for receiving the tape cartridge and moving the cartridge into operative engagement with a data tape drive in response to a linear actuation. The loader also includes a substantially flat actuator arm, for providing the linear actuation. The arm is mounted for pivotal motion, and it is coupled to the loader means, such that the pivotal motion of the actuator arm provides the necessary linear motion of the loader means. The actuator arm has a step-down sector gear, for rotating the actuator arm in response to a drive gear force applied through the sector gear.

The degree of offset of the sector gear with respect to the substantially flat arm preferably is the minimum needed to fit the arm, the sector gear and the associated drive gear into the minimal design envelope. The offset creates a moment of torque tending to twist the arm during actuation. The larger the offset, the higher this twisting torque moment.

In the preferred embodiment, the centerline of the teeth of the step-down gear is out of line from the central plane of the actuator arm. In fact, the offset may be such that the teeth of the sector gear do not cross the central plane of the actuator arm, and the teeth actually extend out beyond a surface plane, such as the lower surface, of the arm.

The disclosed embodiments also include a guide, for interaction with a distal end of the actuator arm during rotation of the arm, to limit any twisting due to the force moment caused by the offset of the sector gear relative to the arm. Preferably, the guide is a fixed member having a substantially flat section with a leading edge extending over the path of travel of the distal end of the actuator arm.

The preferred embodiments include a number of unique aspects relating to actuation by the sector gear and the arm. For example, the arm preferably includes a groove at a distance from its axis of rotation. The groove edges serve as cam profiles, to drive a bearing attached to the conveyor to move the conveyor along a linear path during loading and unloading operations. The groove edges are contoured to maintain substantially 90° contact with a circumference of the bearing, during each linear motion of the bearing and conveyor. The actuator also preferably includes an impact buffer spring, to bias the bearing within the groove.

The use of the flat actuator arm and cam follower further helps to minimize the height of the elements for converting the motive force into a linear actuation of the conveyor. Also these elements are relatively simple and durable. The selection of the cam profile contour, to maintain perpendicular force on the follower bearing provides efficient transfer of linear force, preferably to push the follower and the conveyor. The torsion spring may serve a number of different functions. If the cam profile is that used during loading, the spring biases the follower bearing into engagement with the profile and provides impact buffering between the conveyor and the actuator arm, to absorb impacts due to insertion of the tape cartridge. If the cam profile is that used in an unloading operation, the torsion spring actually helps to push the follower bearing and thus the conveyor.

Another aspect of the invention relates to an automatic tape cartridge loader, for loading a tape cartridge into a tape drive for reading and writing of data on a tape within the cartridge. This loader includes a frame housing, a conveyor and an actuator arm. The conveyor is mounted for linear motion within the frame housing. The actuator arm is substantially flat and is coupled to the frame housing for rotation about a fixed axis. The arm has a groove at a distance from the axis. One or more of the edges of the groove provide substantially perpendicular cam contact to the bearing on the conveyor, during at least one rotational movement of the actuator arm. The arm has a step-down sector gear attached along a peripheral section thereof. As a result of the step-down, a centerline of the sector gear is offset from a plane of the actuator arm. A motor and gear system coupled to the sector gear drive the rotation of the actuator arm about the axis, and through the coupling to the conveyor, produce the linear motion of the conveyor within the frame housing.

In the preferred embodiment, the loader also includes a cartridge shuttle, for receiving the tape cartridge. The shuttle is mounted for movement within the conveyor, preferably in two orthogonal directions. A least one cam profile on the conveyor and at least one cam follower bearing attached to the cartridge shuttle interact to produce a two dimensional movement of the cartridge shuttle in response to linear motion of the conveyor.

The cam profile and cam follower arrangement coupling the shuttle to the conveyor enables movement of the shuttle to and from a position within the loader in which the gear within the tape cartridge engages the tape drive gear, in response to the linear movements of the conveyor during loading and unloading of the tape cartridge. The preferred loader also includes means for assisting in overcoming the attraction by the magnet and in separation of the gear within the tape cartridge from engagement with the tape drive gear. This assistance for unloading may take the form of a specific arrangement of the cams and profiles in the coupling between the shuttle and the conveyor, As an alternative or in addition, the assistance for unloading may take the form of one or more compression springs.

In the preferred embodiment, the cam and profile arrangement actually includes two profiles on the conveyor and two cam followers attached to the shuttle. The profiles are formed on opposite sides of the conveyor, and the cam followers are attached to opposite sides of the shuttle. The cam followers are different sizes, and the associated cam profiles apply somewhat different forces to the sides of the shuttle during unloading. Each profile includes a first inclined section having a high pressure angle, for inducing a substantial portion of the motion of the shuttle toward cartridge-loaded position. Two compression springs provide extra lift during unloading. A second section of the profile has a low pressure angle, for inducing additional motion of the shuttle during loading, to reach or pass the cartridge-loaded position and overcome the opposing spring force.

The preferred embodiment of the shuttle includes cantilevered springs for applying spring force toward the tape drive motor to the cartridge within the shuttle and for buffering the cartridge within the shuttle. The cam profiles induce motion of the shuttle slightly past the cartridge-loaded position, to produce a gap between a surface of the cartridge and an adjacent surface of the shuttle. The cantilevered springs buffer the cartridge within the shuttle, when the shuttle moves past the cartridge-loaded position.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

FIGS. 2 and 3 are isometric views from different angles and at somewhat different magnifications, showing a preferred embodiment of the actuator arm and sector gear used in a loader mechanism similar to that of FIG. 1.

FIG. 4 is a top plan view of the actuator arm and sector gear of FIGS. 2 and 3.

FIGS. 5-A to 11 relate to a preferred embodiment of a loader incorporating the inventive concepts, showing aspects thereof as summarized below.

FIG. 5-A is an isometric view of a preferred embodiment of a loader assembly frame housing, in accord with the invention.

FIG. 5-B is an exploded isometric view of the loader assembly housing and the conveyor showing the interconnection thereof in the preferred embodiment.

FIG. 6-A is an isometric view of the assembly formed by the cartridge shuttle and the flat spring assembly, from the back side.

FIG. 6-B is an exploded isometric view of the assembly formed by the cartridge shuttle and the flat spring assembly from the front (cartridge loading) side.

FIG. 7A is a side isometric view, illustrating the interacting elements of the cartridge and the cartridge shuttle, with the shuttle and cartridge inverted to show the lower side thereof.

FIG. 7B is a back side isometric view showing the cartridge and the cartridge shuttle in the loaded position on top of the reel motor.

FIG. 8-A is an isometric view of the loader assembly with the shuttle conveyor actuator, from the front (cartridge loading) side.

FIG. 8-B is an exploded isometric view of the loader assembly and the shuttle conveyor actuator from the front (cartridge loading) side.

FIG. 8-C is an isometric view of the cartridge loading motor and worm gear assembly.

FIG. 9-A is a detailed view of the cam follower, the cam profile and the impact buffer spring of the shuttle conveyor actuator, at the start of cartridge loading.

FIG. 9-B is a detailed view of the cam follower, the cam profile and the impact buffer spring of the shuttle conveyor actuator, at the start of cartridge unloading.

FIG. 10-A is a detailed view of the two cam profiles of the left sidewall of the conveyor and the cam followers of the shuttle cartridge riding within those profiles.

FIG. 10-B is a detailed view of the cam profile of the right sidewall of the conveyor and the cam follower of the shuttle cartridge riding within that profile.

DESCRIPTION OF THE PREFERRED EMBODIMENTS

Figure 1:
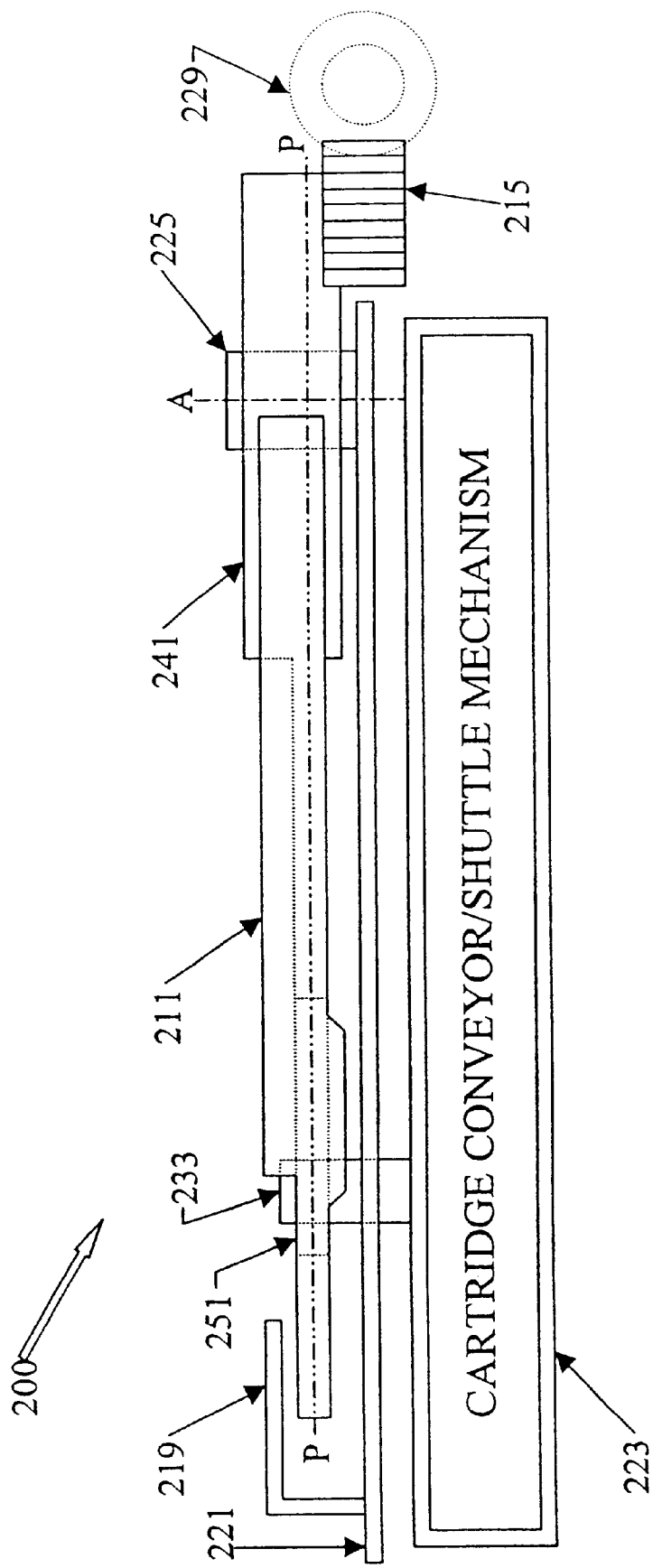
FIG. 1 is an enlarged front view of a tape cartridge loader mechanism incorporating a substantially flat actuator arm with a stepped-down or offset sector gear, in accord with the inventive concepts.

FIG. 1 shows a stylized representation of a tape cartridge loader mechanism 200 incorporating a substantially flat actuator arm 211 with an integral step-down sector gear 215 as well as an actuator guide 219, in accord with the present inventive concepts.

The tape cartridge mechanism 200 includes a stationary frame or housing, a portion of which is shown at 221 in the drawing. As discussed in more detail later with regard to a preferred embodiment, the frame 221 supports a cartridge conveyor/shuttle mechanism 223. The support of the mechanism 223 by the frame 221 is such as to permit movement thereof relative to the frame in at least one dimension and preferably in two orthogonal directions. For example, if oriented as shown, the support might enable the loader mechanism 200 to move a cartridge within the conveyor/shuttle mechanism 223 backward and down, during loading, to engage the cartridge with the appropriate tape drive elements (not shown).

The actuator arm 211 includes a bearing opening sized so as to surround a pivot pin 225, attached to the frame housing 221. The actuator arm 211 rotates about the axis A of the bearing formed by the pivot pin 225 and the opening through the arm. The axis A is substantially perpendicular to the plane and major surfaces of the arm 211. The region of the arm 211 surrounding the bearing includes raised bosses, to insure adequate strength and rigidity. The outer boss 241 is visible in the orientation shown in FIG. 1.

The portion of the periphery around the end of the arm 211 centered about the axis of the pin and opening is semicircular. Along a portion of the semicircular end of the arm 211, the arm includes the step-down sector gear 215. The teeth of the sector gear 215 extend out substantially radially from the axis A, to edges that are substantially vertical when oriented as shown.

In accord with an aspect of the present invention, the sector gear 215 is substantially out of the plane P of the actuator arm 211. The centerline C of the teeth of the sector gear 215 is not in-line with the plane P corresponding to the center of the actuator arm 211. The degree of offset depends on the space available within the design envelope of the drive. In the exemplary configuration shown, the teeth of the sector gear 215 extend down from just below the central plane P of the flat arm, and a substantial distance past the lower edge of the circular boss 241. Consequently, teeth of the sector gear 215 do not cross the plane P of the actuator arm 211. This sector gear 215 forms a "step-down" in relation to the periphery of the proximal end of the flat actuator arm 211.

Preferably, the step-down sector gear 215 extends along an arc of approximately 90° around the peripheral section of the flat actuator arm 211 about the pivotal axis. In the illustrated embodiment, this arc includes a portion that is directly opposite the distal end of the actuator arm 211, with respect to the pivotal axis A. The step-down sector gear 215 could be located along other arcs around the axis.

A force applied to the sector gear 215 would be perpendicular to a radius of the gear arc (tangential to the arc). Those skilled in the art will recognize that such a force would cause the arm 211 to rotate about the pivot 225. The preferred embodiment utilizes an electromagnetic motor, a gear reduction box, an encoder, a gear train and a worm gear to drive the actuator arm 211 through the sector gear 215. For ease of illustration, FIG. 1 shows the teeth of the worm gear 229, in dotted line form. As the drive system turns the worm gear 229, the interaction between the teeth of the gear 229 and the teeth of the gear 215 causes the actuator arm 211 to rotate about axis A of the pivot pin 225. If the worm gear 229 rotates in one direction, the rotation of the arm 211 moves the distal end of the arm backward, in the orientation shown. Similarly, if the worm gear 229 rotates in the opposite direction, the rotation of the arm 211 moves the distal end of the arm foreword.

The offset of the sector gear 215 relative to the plane P of the arm 211 causes the driving of that gear to create a force moment that tends to twist the arm 211. The offset should be as small a possible. Preferably, the offset is only sufficient to keep the components within the necessary design envelope, so as to minimize this twisting force moment. In any case, there will be some force on the arm 211 tending to twist the arm so as to move the distal out of its intended path of travel. The actuator guide 219 prevents such twisting motion away from the frame 221 and effectively counteracts the twisting force resulting from the gear offset.

The actuator guide 219 is mounted on the frame 221. The guide 219 is formed and mounted on the frame so as to support a leading edge of the actuator guide 219 above the distal end of the actuator arm 211. As will be clearer in later drawings, the leading edge of the actuator guide 219 extends along and above the path of travel of the distal or radial end of the actuator arm 211. Effectively, the distal end of the actuator arm 211 travels in the space between the frame 219 and the guide 219. The guide 219 limits any possible upward movement of that end of the arm 211, to prevent twisting of the arm due to the force moment caused by the action of the worm gear 229 on the step-down sector gear 215. The frame 219 limits any downward twisting movement of the arm.

The mechanism 200 includes a mechanical system arranged to couple the actuator arm 211 to the cartridge shuttle/conveyor mechanism 223. The preferred embodiments of the coupling utilize a combination of at least one cam follower and one or more grooves to convert the rotation of the actuator arm 211 into the desired movement of the shuttle/conveyor mechanism and the cartridge within.

In the illustrated embodiment, the actuator arm 211 includes a groove 251, shown in dotted lines, extending through the actuator arm itself. The edges of the groove 251 form cam surfaces. A cam follower bearing 233 connected to the cartridge conveyor/shuttle mechanism 223 transfers the motion of the distal end of the actuator arm to the conveyor/shuttle mechanism 223. Preferably, the bearing and groove are arranged such that the actuator imparts a linear motion to the cam follower. For this purpose, the frame 221 may have a linear groove to define the limits of the movement of the cam follower bearing 233. The conveyor/shuttle mechanism 223 will move at least back and forth along the linear path with the bearing 233. The preferred embodiment of the conveyor/shuttle mechanism 223 actually imparts a two-dimensional movement to a cartridge transported by the mechanism 223.

In many implementations, the guide 219 becomes the actual top of the loader mechanism 200. The actuator arm 211 and the guide 219 provide a particularly low profile. The use of the step-down gear 215 allows a lowering of the worm gear 229. As a result, the loader mechanism 200 makes particularly efficient use of space within the design envelope for the drive. The use of the worm and sector gear to drive a flat actuator arm, however, also provides a particularly durable drive system for moving the cartridge conveyor/shuttle mechanism 223 within the loader mechanism 200.

FIGS. 2 to 4 provide a number of different views of a preferred embodiment of the actuator arm 211. The arm 211 has a bearing opening 239 formed slightly larger than the pivot pin 225 (FIG. 1) to allow rotation of the arm. Two raised circular bosses 241 and 243 surround the opening 239. The opening 239 and the circular bosses 241 and 243 are concentric about the pivot axis. Four spokes 245 extend along radii from the axis, between the two circular bosses 241 and 243. The circular bosses 241 and 243 and the spokes 245 extend above the plane of the arm 211 and serve to strengthen the arm in the region around the bearing opening 239. At least the outer boss 241 extends below the plane of the arm 211. To add further rigidity to the arm, the arm 211 includes raised bosses 247 extending from the circular boss 241 along approximately two-thirds of the lateral edges of the upper surface of the flat arm 211. The arm further includes a raised cross-member 249 extending through a somewhat bent path across the upper surface of the flat arm 211 between raised edge bosses 247.

The outer surface of the circular boss 241 forms the outer periphery of the arm 211 in the region opposite the distal end of the arm and around the pivot axis and opening 239. The stepdown sector gear 215 is formed as an integral extension from the lower peripheral portion of the boss 241.

As shown most clearly in the plan view of FIG. 4, the sector gear extends through an arc of approximately 90° along the periphery of the arm 211 formed by the outer surface of the boss 241. The arm 211 essentially is a lever. The length of the gear is determined by the amount of angular rotation of the arm that is necessary to achieve a particular linear actuation of the cartridge conveyor/shuttle mechanism with an arm (lever) or a particular length. In the illustrated example, the sector gear 215 extends from an angle shown as slightly above the diagonal formed from the distal end through the axis of the opening 239 (slightly above the horizontal spoke in the illustrated orientation). The arc of the sector gear 215 extends across that diagonal and extends toward the 90° angle shown below that diagonal in the drawing. Depending on the precise location and orientation of the worm gear, the sector gear may be formed at somewhat different locations around the circular boss 241.

To convert the rotation of the actuator arm 211 to a linear motion for driving the cartridge conveyor/shuttle mechanism 223, the arm 211 includes a curved groove 251 in the region approaching the distal end of the arm. The front and back edges of the groove 251 form cam profiles for cartridge loading and unloading. The groove 251 is wider than the diameter of the associated cam follower bearing 233 (FIG. 1), so that when the bearing follows one edge or profile of the groove 251 there is a gap between the bearing and the opposite edge of the groove. The contours of these cam profiles are chosen to impart a perpendicular force to the cam follower bearing, throughout motion of the arm 211 during both the loading operation and the unloading operation, as described later in more detail with regard to the preferred embodiment.

The actuator arm 211 also includes a pivot 253, projecting upwards from the upper surface of the arm between the raised cross-member 249 and one end of the groove 251. In the preferred embodiment discussed below, the actuator arm supports a torsion spring, which serves as an impact buffer. The coil of the impact buffer spring fits around the outside of the pivot 253. The pivot is threaded, to receive a screw-in retainer cap that holds the torsion spring in its operative position.

The other drawings (5-A to 11) depict a preferred embodiment of a tape drive 1, incorporating the concepts of the inventions. Further discussion will concentrate on that preferred embodiment.

The tape drive 1 includes a base 9 and a loader assembly 11 (see e.g. FIGS. 5-B and 11). The loader assembly 11 receives a tape cartridge, for example containing a magnetic tape or other tape media for storage of digital data. In the presently preferred embodiments, the cartridge is a single-reel tape cartridge containing magnetic tape. The loader assembly 11 loads the cartridge into engagement with a drive motor and opens a door on the cartridge to provide access to a leader attached to the tape contained within the cartridge. A load arm assembly, not shown, connects to the leader and withdraws the leader for coupling to a take up reel. While so engaged, the tape from the cartridge may be repeatedly wound and rewound between the cartridge and the take up reel, while data is read from and/or written to the magnetic tape.

The tape drive 1 may be loaded manually, or the tape drive may receive a cartridge from another mechanism, for example from a robotic tape selector in a tape library system.

For ease of description, the text below refers to insertion of a tape by a user. Those skilled in the art will recognize that this "user" may be a human operator or an automated device or system for selecting one of many available tapes, for example in a library of such tapes, and inserting the selected tape through a bezel opening into the tape drive.

The tape drive 1 may be orientated in any convenient direction. For purposes of discussion, it is assumed that the opening for insertion of the tape cartridge corresponds to the "front" of the drive, and the width of the opening to receive the cartridge would be horizontal. The user would insert the cartridge with a front-to-back motion. In several of the drawings, such as 5-B and 11, the base 9 and/or the loader assembly 11 of the drive 1 are shown in a position to receive the cartridge from the front, and the loader assembly 11 retracts and lowers the cartridge during loading, to engage the tape within the drive. For convenience of discussion, references to horizontal, vertical, various sides and front and back will assume such a normal orientation of the drive 1, and where appropriate to a corresponding orientation of the cartridge, as shown in those drawings. The orientations shown and the descriptive references thereto, however, are for purposes of illustration and example only.

Figure 11:
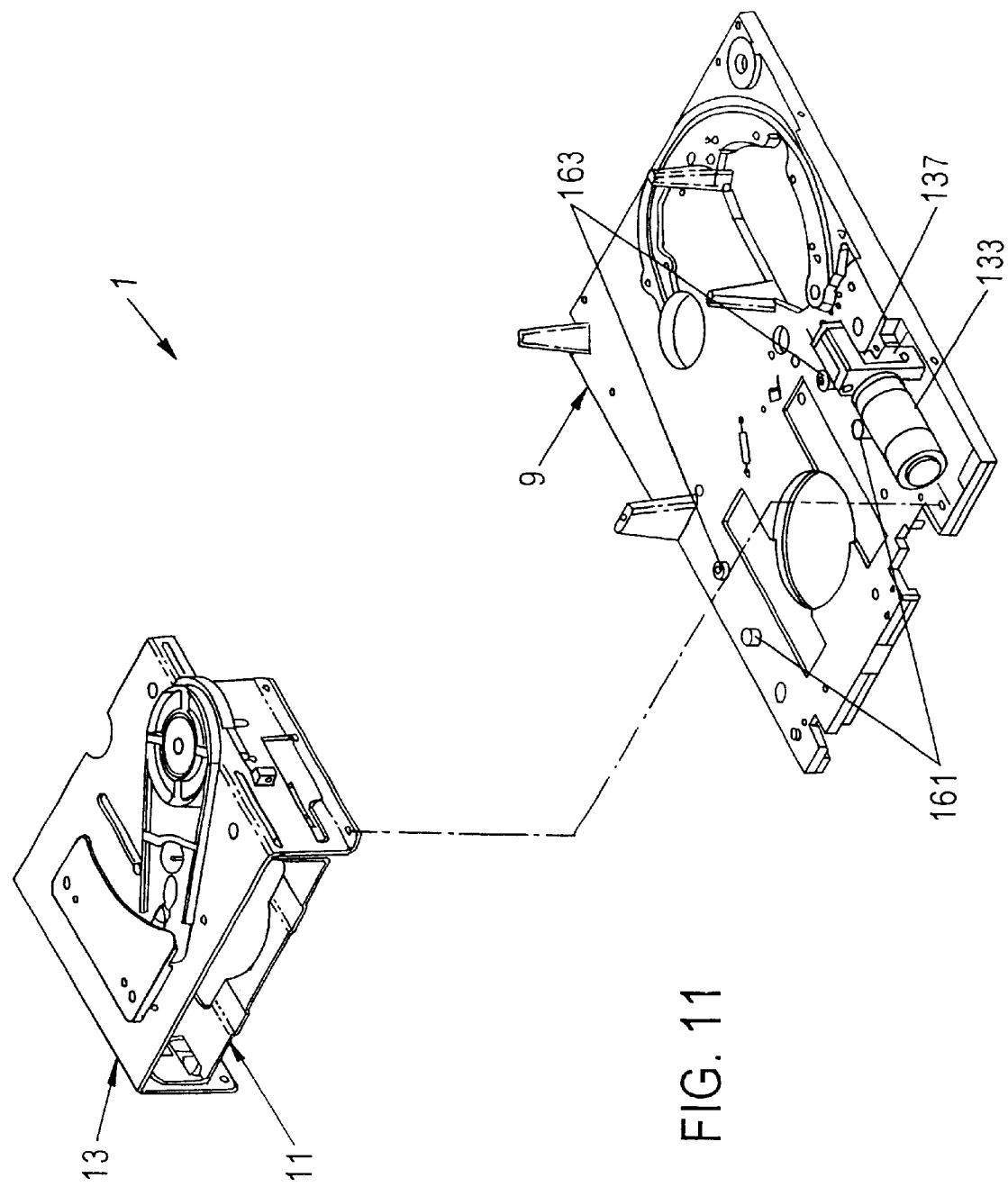
FIG. 11 is a partially exploded isometric view of the shuttle assembly, the cartridge loader motor and the tape drive base.

The tape drive 1 includes a base 9 and a loader assembly 11 (FIG. 11). The loader assembly 11 comprises a frame housing 13 (FIGS. 5-A, 5-B). If the base 9 is horizontal, as shown in FIG. 11, the loader assembly frame housing 13 is secured to the top side of the base 9, for example by rivets or the like. As discussed more, later, the loader assembly 11 includes the unique actuator system, which is designed for durability yet occupying minimal space within the design envelope for the loader. The actuator system uses a substantially flat actuator arm with an offset sector gear. The actuator system includes a cam profile and follower arrangement and/or one or more springs specifically configured to assist in separating the cartridge from the drive motor during an unloading operation.

With reference to FIG. 5-A, the loader assembly frame housing 13 comprises a right sidewall 15, a planar top plate 17 and a left sidewall 19. The sidewalls 15, 19 are substantially perpendicular to the top plate 17. The right sidewall 15 includes a horizontal shoulder at the bottom with two or more holes therethrough, to facilitate attachment of the sidewall to the top of the base (FIG. 11). The left sidewall includes two or more horizontal holes therethrough, to facilitate attachment to the side of the base.

Each sidewall 15, 19 of the loader assembly frame housing 13 includes two linear travel grooves 21. In the illustrated embodiment, the grooves 21 are adjacent to the top of the respective sidewall and extend parallel to the top plate 17. The conveyor includes a cam follower bearing for interaction with each of the linear travel grooves. In the illustrated implementation, these follower bearings comprise machine screws or pins and bearings mounted for rotation about the pins. A pin 23 passes through a bearing 25 and is attached to a hole in the matching sidewall of the conveyor 27. The bearings 25 are slightly smaller in diameter than the vertical height of the linear travel grooves 21. The linear grooves 21 and the associated cam follower bearings 25 provide vertical support for the conveyor 27. Each of the bearings 25 travels along one of the linear grooves 21, to provide a precise front-to-back linear travel for the conveyor 27.

The top plate 17 of the loader assembly frame housing 13 includes another linear travel groove 29. In the illustrated embodiment, the groove 29 is substantially centered in the top plate 17 between the two sidewalls 15, 19. The groove 29 is somewhat longer than the individual grooves 21. The conveyor 27 includes two cam follower bearings for interaction with the top linear travel groove 29, for example formed by pins 31 and bearings 33. A pin 31 passes through a bearing 33 and is attached to a hole in the matching top plate of the conveyor 27. The bearings 33 are slightly smaller in diameter than the width of the linear travel groove 29. The bearings 33 travel along the linear groove 29 in the top plate 17, to limit lateral movement of the conveyor during front-to-back linear travel of the conveyor 27.

As shown, the front pin 31' actually is somewhat taller than the back pin 31, and the pin 31' passes through two bearings 33, 33'. The lower bearing 33 engages the linear travel groove 29, for control of the front to back motion of the conveyor 27. As discussed more later, the upper bearing 33' forms a cam follower bearing engaging a cam profile within an actuator arm, which induces the movement of the conveyor 27. The back pin 31 and bearing 33 form a path guide bearing.

The sidewall 15 of the frame 13 includes a path constraint groove 35. The groove 35 includes a first linear section extending horizontally (parallel to the top plate 17) in the front-to-back direction along the sidewall. A second linear section, at the back of the groove, extends vertically downward.

The conveyor 27 comprises a right sidewall 37, a top plate 39 and a left sidewall 41. The sidewalls 37, 41 are substantially perpendicular to and extend vertically downward from the top plate 39. The sidewalls of the conveyor 27 include inclined cam profiles 43, 45. Specifically, the right sidewall 37 includes one inclined cam profile 43, approximately mid-way from front to back along the wall, for raising and lowering the cartridge shuttle (shown in other drawings). The left sidewall 41 includes two cam profiles 45, for use in raising the left side of the cartridge shuttle.

The linear grooves 21, 29 and associated cam follower bearings coupled to the conveyor 27 enable front-to-back linear motion of the conveyor within the loader assembly frame housing 13. In a preferred embodiment, the conveyor moves 31.4 mm horizontally. The inclined cam surfaces 43, 45 in the sidewalls 37, 41 of the conveyor 27 produce a vertical movement of the cartridge shuttle assembly. The cam follower bearing engaging the inclined cam profile 43 also engages the path constraint groove 35 in sidewall 15. The groove 35 controls the direction and extent of travel of the cartridge shuttle during loading and unloading operations.

FIGS. 6-A and 6-B illustrate the structure of the cartridge shuttle assembly 47. FIG. 6-A is an isometric view from the back of the assembly, whereas FIG. 6-B is an isometric view from the front of the assembly. This assembly 47 essentially comprises two elements, the cartridge shuttle 49 and a flat spring assembly 51.

The cartridge shuttle 49 comprises a right sidewall 53, a planar bottom plate 55 and a left sidewall 57. The sidewalls 53, 57 are substantially perpendicular to and extend vertically upward from the bottom plate 55. As shown in FIG. 6-B, the left sidewall 57 of the cartridge shuttle 47 includes two extruded features 59, which extend toward the center of the shuttle assembly 47. As the user inserts a tape cartridge into the shuttle, the extruded features 59 engage the left side of the tape cartridge and push the cartridge toward the right side of the cartridge shuttle assembly 47. Essentially, the features 59 serve to justify the cartridge to the right, during loading of the cartridge into the drive. The features 59 maintain the cartridge in the justified position throughout loading, data read/write operations and unloading of the tape from the tape drive.

The back end of the bottom plate 55 includes two extensions near the left and right edges of the plate. These extensions include vertical projections 61, which serve as cartridge stops. When the user inserts the cartridge, the user pushes the cartridge from front-to-back inside the tape cartridge shuttle assembly 47. The projections or stops 61 limit the travel of the cartridge from front-to-back into the tape cartridge shuttle assembly 47.

Each sidewall 53, 57 connects to an attachment plate 63, 65 bent back at right angles to the sidewalls toward the top-center section of the shuttle assembly 47. Each of the attachment plates includes four holes for receiving rivets 66, to secure the flat spring assembly 51 to the cartridge shuttle 49.

The attachment plate 65 extends somewhat more to the rear of the assembly 47 (FIG. 6B), to allow attachment of a sensor switch support 67 (FIG. 6-A). The sensor switch support 67 in turn supports a cartridge-in sensor switch 69 with a flexible cable guide 71 for the electrical cable connection to the switch. When the user inserts the cartridge, the user pushes the cartridge from front-to-back inside the assembly 47 until the cartridge engages the stops 61. As the cartridge approaches the stops 61, it also actuates the sensor switch 69. The switch 69 provides a signal to the drive control circuitry (not shown) indicating insertion of a cartridge and triggering actuation of the loader motor assembly, as discussed more later.

The right sidewall 53 includes a bent feature 73 extending inwards from the back edge of the wall. The feature 73 is positioned along the wall 53 and extends inward an appropriate distance, so as to engage a sliding tape door on the right side of the tape cartridge. As the cartridge enters the shuttle and travels to the back thereof, the feature 73 engages and pulls the tape door of the cartridge toward the rear of the cartridge. This opens the tape door of the cartridge, and enables access to the tape leader pin by a load arm assembly (not shown).

Near the lower front corner, each sidewall 53, 57 includes a rectangular opening 74, which extends somewhat into the bottom plate 55. The openings 74 enable mounting of flat springs and extension of the springs into the interior of the cartridge shuttle assembly 47. The springs (one of which appears in a later drawing) engage notches in the tape cartridge.

Consider now the flat spring assembly 51. As noted, this assembly 51 is mounted across the top of the cartridge shuttle 49. The spring assembly 51 includes a front tip 75 for vertically guiding the cartridge as the user inserts the cartridge through a bezel opening (not shown) into the tape drive. The assembly 51 includes a plate 77 for actual attachment of the spring assembly 51 to the plates 63, 65 associated with the sidewalls of the cartridge shuttle 49 by the rivets 66. The plate 77 in turn supports four cantilevered flat springs 79. Two of the springs 79 extend to the right of the assembly 51, along the front and the back of the assembly (FIG. 6-B). The other two springs 79 extend to the left of the assembly 51, along the front and the back of the assembly. Each spring 79 includes a cartridge pressure button 81 extending down through the distal end of the spring. The buttons 81 contact the top surface of a cartridge when contained within the cartridge shuttle assembly 47. The buttons 81 transfer spring pressure downwards from the cantilevered flat springs 79 to the cartridge, to assist in engaging the tape reel of the cartridge with the tape chuck of the drive motor and to buffer the cartridge vertically within the shuttle, as discussed more below.

The cartridge shuttle assembly 47 together with the conveyor 27 receive the tape cartridge, and they enable horizontal and vertical motion from the position where the cartridge passes through the bezel opening into the tape drive to the cartridge-loaded position where the tape reel engages the drive motor chuck and the actual tape may be withdrawn from the cartridge for data read/write operations. To facilitate this motion, the sidewalls 53, 57 include attachment holes 83, for attachment of cam follower bearings to the assembly 47. As visible in the front isometric view of FIG. 6-B, the right sidewall 53 includes a single attachment hole 83 approximately mid-way along the sidewall, for attachment of a cam follower bearing to engage the cam profile 43 of the right sidewall 37 of the conveyor 27 as well as the path constraint groove 35 in the right sidewall 15 of the frame housing 13. As visible in the rear isometric view of FIG. 6-A, the left sidewall 57 includes two attachment holes 83. These two holes enable attachment to the cartridge shuttle 49 of cam follower bearings to engage the inclined cam profiles 45 of the left sidewall 41 of the conveyor 27.

FIG. 7A shows a tape cartridge 91 inserted in the cartridge shuttle assembly 47. In this drawing, the tape cartridge and the shuttle assembly are turned upside down, to show the underside thereof. As shown, the bottom plate 55 of the cartridge shuttle 49 includes an opening 93. The opening 93 extends laterally across the central portion of the bottom plate and provides access to the bottom of the cartridge 91, specifically to the central drive gear 95 of the tape cartridge. The drive gear 95 is coupled to the bottom of the tape spool within the cartridge 91. The drive gear 95 comprises a metal or magnetic plate 97 around the coupling to the central shaft and downwardly extending gear teeth 99 around the periphery of the gear. The material of the plate 97 is such as to enable attraction of the cartridge drive gear to a magnet within the motor gear.

FIG. 7A also depicts the tape drive motor 101. As shown, the motor includes a vertical drive shaft 103, driven to rotate by the electromagnetic components of the motor. A motor drive gear 105 is secured to the upper end of the drive shaft 103. The motor drive gear 105 includes a ring-shaped magnet 107 about the end of the shaft 103 and a ring of upwardly extending gear teeth 109 around the periphery of the gear. The size of the teeth 109 and the diameter of the ring of teeth 109 correspond to those of the gear teeth 99 on the cartridge drive gear 95, to enable the two sets of teeth to mesh when the cartridge is in its loaded position.

The magnet 107 on the motor drive gear 105 interacts with the plate 97 of the cartridge gear 95, as the shuttle assembly 47 lowers the cartridge 91 to the position shown in FIG. 7B, to provide a magnetic clutch action. The magnetic force between the magnet 107 and the plate 97 pulls the cartridge gear 95 toward the motor drive gear 95 to provide a positive mesh between the two sets of peripheral gear teeth 99, 109.

FIG. 7A shows two additional openings 111 near the back corners of the bottom plate 55 of the cartridge shuttle 49. When a cartridge 91 is fully inserted into the shuttle assembly 47, as shown, the openings 111 provide access to small holes 113 formed in the bottom of the cartridge 91. These holes are used for registration with features on the base plate, as the loader assembly lowers the cartridge into its full, operational position, as discussed more later with regard to FIG. 11.

FIGS. 8-A to 8-C illustrate the elements of the automatic actuator assembly, for producing the linear back and forth movements of the conveyor. FIG. 8-A depicts the loader assembly 11 with the shuttle conveyor actuator arm 121 and the actuator guide 123 mounted on the top of the frame housing 13. The actuator arm 121 essentially corresponds to the arm 211 discussed above relative to FIGS. I to 4. Of particular note, the arm 121 includes a sector gear 129, which is offset relative to the substantially flat portion of the actuator arm 121, in the same manner as was the gear 215 in the embodiment of FIGS. 1 to 4.

The actuator arm 121 includes a bearing opening 125 (FIG. 8-B). The bearing opening 125 is sized slightly larger than the pivot pin 127, securely attached to the top of the frame housing 13 (FIG. 8-B). The pivot pin 127 and opening 125 form a bearing enabling rotational motion of the arm 121 about the axis of the pin and opening. Surrounding regions of the arm include raised bosses, to insure adequate strength and rigidity.

The actuator arm 121 is a relatively flat member extending from the pivot axis across the top of the frame housing 13. The flat construction of this arm minimizes the vertical space occupied by the means for actuating the conveyor in response to the motive force of the loader motor assembly.

The portion of the periphery around the end of the arm 121 centered about the axis of the pin and opening is semicircular. Along a portion of the semicircular end of the arm 121, the arm includes a series of sector gear teeth 129. The sector gear teeth extend out radially, to edges that are substantially vertical. However, the sector gear 129 is offset below the plane of the arm 121, in exactly the manner discussed above relative to the gear 215 and the arm 211.

FIG. 8-C presents an isometric view of the loader motor assembly 131. The assembly 131 includes an electromagnetic motor 133, a gear reduction box, an encoder, a gear train and a worm gear 135. The assembly also includes a bracket 137 for securely attaching the assembly 131 to the base (see FIG. 11). The teeth of the worm gear 135 essentially form a screw, which rotates about a horizontal axis. The motor 133, gear reduction box, and gear train drive the worm gear 135 to rotate about its axis. The gear 135 may rotate clockwise or counterclockwise about its axis, depending upon the drive signals applied to the motor 133, to drive the various operations of the loader assembly 11.

When assembled, the teeth of the worm gear 135 of the motor assembly 131 engage the sector gear teeth 129 on the periphery of the end of the actuator arm 121. The motor assembly 131 rotates the worm gear 135, and the interaction between the teeth of the gear 135 and the teeth of the gear 129 causes the actuator arm 121 to rotate about the pivot axis formed by the pin 127 and the opening 125. Rotation of the worm gear 135 in a first direction will cause the actuator arm 121 to rotate about its axis in a clockwise direction (when viewed from the top as in FIG. 8A). For example, during a loading operation, this drive operation would move the actuator arm from the position shown in FIG. 8A to a position around to the right. Later rotation of the worm gear 135 in a second direction will cause the actuator arm 121 to rotate about its axis in a counterclockwise direction to drive the actuator arm back to the position shown in FIG. 8A, to unload a cartridge.

The actuator guide 123 is mounted on the top plate of the frame housing 13. The front and back ends of the guide 123 include bosses, to support the guide at a distance above the top plate 17 of the housing frame 13. A leading edge of the actuator guide 123 extends to the right, above the path of travel of the distal or radial end of the actuator arm 121. Effectively, the radial end of the actuator arm 121 adjacent the groove 141 travels in the space between the top plate of the frame housing 13 and the guide plate 123. The guide 123 limits any possible upward movement of that end of the arm 121, to prevent twisting of the arm during its movement to load and unload cartridges from the tape drive 1, as discussed earlier with regard to the guide 219.

The top surface of the guide 123 is the actual top of the loader mechanism. The actuator arm 121 and the guide 123 provide a particularly low profile and make efficient use of space within the design envelope for the drive. The offset or step-down of the gear 129 enables the use of a lower profile drive system and a lower positioning of the worm gear 135.

As shown by the discussion above, the drive motor assembly 131 drives the actuator arm 121 to rotate. The conveyor 27, however, moves in a linear direction along the front-to-back axis of the loader assembly 11. To convert the rotation of the actuator arm 121 to a linear motion for driving the conveyor 27, the arm 121 includes a curved groove 141. The front and back edges of the groove 141 form cam profiles for cartridge loading and unloading. The groove is wider than the diameter of the associated cam follower bearing, so that when the bearing follows one edge or profile of the groove there is a gap between the bearing and the opposite edge of the groove.

FIG. 8-B shows the cam follower bearing 33' attached to the conveyor, for interaction with the edges of the groove 141. The lower bearing 33 on the front pin and the back bearing 33 interact with the linear travel groove 29, as discussed above relative to FIG. 5-B. The camming action of the edges of the groove 141 moves the follower bearing 33' back and forth in a linear fashion along the groove 29 in the top plate 17 of the frame housing 13. This motion of the follower 33' in turn induces linear movements of the conveyor 27.

The actuator arm 121 includes a pivot 145, projecting upwards from the upper surface of the arm near one end of the groove 141. The actuator arm 121 also supports a torsion spring 147, which serves as an impact buffer. The coil of the impact buffer spring 147 fits around the outside of the pivot 145. A retainer 149 attaches to the pivot 145 to hold the spring 147 in place. The retainer is a flat member threaded on the bottom for attachment to matching threads of the pivot 145. The retainer has flat sides to enable a technician to turn the retainer to attach or detach it from the pivot. This design of the retainer minimizes the height thereof, to keep the loader mechanism within height constraints for the design profile of the drive.

In the preferred embodiments, the bottom, the left and right sides, and the back of the drive 1 are enclosed by a housing (not shown). Because of the small height allowed for the drive, the housing does not cover the arm 121 and the guide 123 on the top of the loader.

FIGS. 8-A and 8-B also show the interaction of the home position sensor switch 151 with the cam follower bearing 153 attached to the shuttle. Specifically, the frame housing 13 supports an attached micro-switch 151 near the front end of the horizontal section of the path constraint groove 35 (FIG. 8-B). The home position sensor switch 151 provides a control signal to stop the loader motor operation when it detects the cam follower 153 attached to the shuttle approaching the front end of the groove 35, at the end of an unloading operation.

In FIG. 8-B, one of the two flat springs 155 is visible through the sidewall opening 74 (FIG. 6-B). The springs 155 register with notches in the lower side edges of the tape cartridge housing, when the tape is fully inserted into the shuttle assembly.

FIGS. 9-A and 9-B show the interaction of the groove 141, the cam follower bearing 33' and the spring 147 in somewhat more detail. The spring 147 comprises two arms extending outward from the coil about the spring pivot. One arm engages a boss formed on the top of the actuator arm and remains relatively stationary with regard to the arm and the pivot. The other arm extends from the coil outward essentially along the radial dimension of the arm 121. The coil of the spring 147 is dimensioned such that the spring applies a counterclockwise force. This force normally biases the follower bearing 33', and thus the conveyor 27 back toward the bezel opening. The spring 147 serves as an impact buffer, to absorb at least some of the force if any imparted to the conveyor by insertion of a tape cartridge through the opening into the drive.

The contour of the arm of the spring is carefully designed as shown to maintain direct contact with the bearing 33' as the bearing moves along the cam profile edges of the groove. As shown in FIG. 9-A, the spring 147 normally biases the cam follower bearing 33' forward against the cam profile formed by the front edge 141' of the groove. This front edge 141' serves as the cam profile during clockwise rotation of the actuator arm 121 to load a tape cartridge into the drive. The cam profile 141' pushes the follower bearing 33'. Specifically, as the arm 121 rotates from the position shown in FIG. 9-A, the follower bearing 33' engages the edge 141' and moves to the right as shown by the arrow. The force on the follower bearing during the loading operation is controlled by the cam profile of the edge 141'. As the bearing 33' follows the profile edge 141', the bearing 33' also engages and moves inward along the contour of the moveable arm of the spring 147. The serpentine contour of the edge 141' is carefully designed so that as the arm 121 rotates clockwise the edge 141' maintains a constant 90° contact and pressure with respect to the circumferential surface of the follower bearing 33'. The arm of the spring 147 maintains similar 90° contact with the follower bearing 33'.

FIG. 9-B illustrates engagement of the follower bearing 143 with the back edge 141" of the groove, during movement of the actuator arm 121 to unload the tape cartridge from the drive. Both the cam profile 141" and the spring 147 push the follower bearing 33' during unloading. As the arm 121 rotates counterclockwise, to the left from the position shown in FIG. 9-B, the follower bearing 33' engages the edge 141" and moves back to the left as shown by the arrow. The cam profile of the edge 141" and the tension of spring 147 control the force on the follower bearing during the unloading operation. As the bearing 33' follows the profile edge 141", the bearing 33' also engages and moves outward along the contour of the moveable arm of the spring 147. The profiles of the edge 141" and of the arm of the spring 147 are designed to push the circumference of the follower bearing 33' with a 90° force angle, throughout the counterclockwise movement of the actuator arm. When the actuator arm 121 stops moving counterclockwise (position shown in FIG. 9-A), the force of the spring 147 returns the follower bearing 33' to the position where it engages the front edge 141' of the groove, for the next subsequent cartridge loading operation.

Hence, the operation of the loading motor assembly 131 causes the actuator arm 121 to rotate, and the cam profiles of the groove 141 move the follower 33' and the attached conveyor 27 back and forth along a linear path during loading and unloading operations. The direct perpendicular (90°) engagement of the cam profiles and the spring arm to the cam follower bearing maximizes the force transferred from the actuator arm to the conveyor. The tape cartridge shuttle is supported by follower bearings in cam profile grooves in the conveyor. The cam profiles together with the path constraint groove in the frame housing serve to convert the linear movement of the conveyor into a right angle movement of the shuttle and the cartridge within the shuttle. For example, during the loading operation, this right angle movement moves the shuttle and cartridge back into the drive and down into the operational position.

FIGS. 10-A and 10-B depict the cam follower and profile arrangement that couples the shuttle to the conveyor, including the cam profiles 43, 45 formed within the sidewalls 37, 41 of the conveyor 27 and the associated follower bearings. Both drawings depict the cam profiles as if viewed from the right side. Each cam profile comprises an angled groove, with a short section having a low pressure angle, a bend and a somewhat longer inclined section with a higher angle of pressure. In each case, the upper edge 43' or 45' of the groove serves as the cam profile engaging the corresponding cam follower bearing during loading of a tape cartridge. The lower edge 43" or 45" of the groove serves as the cam profile engaging the corresponding cam follower bearing during unloading of a tape cartridge.

The two grooves 45 forming the cam profiles in the left sidewall (FIG. 10-A) have the same dimensions, specifically to facilitate a camming action with a 4mm diameter cam follower bearing 157. The groove 43 forming the cam profile in the right sidewall (FIG. 10-B) has a similar contour, but this groove is wider so as to interact with a 5mm diameter cam follower bearing 153.

The contour of right side conveyor wall 37 includes a notch enabling access through the tape door of the cartridge. Consequently, the wall 37 only has room for one groove 43. To carry the requisite load, the bearing 153 is larger than the bearings 157. To accommodate the larger bearing, the groove 43 is larger than the grooves 45. As a result, the edges 43', 43" present somewhat different cam profiles than do the edges 45', 45".

As the actuator arm moves the conveyor back into the frame housing during a loading operation, the frame sidewalls 37, 41 move from left to right in the orientation illustrated in FIGS. 10-A, 10-B. Initially, the path constraint groove 35 causes the cam follower bearing 153 on the shuttle to move laterally. However, when the follower bearing 153 reaches the end of the horizontal section of the groove 35, the follower bearing 153 can begin to move downward, and the upper edge 43' of the cam groove 43 in the conveyor sidewall 37 becomes an effective cam profile. Similarly, the upper edges 45' of the grooves 45 become effective cam profiles driving the follower bearing 157. As the actuator arm continues to move the conveyor 27 toward the back of the tape drive, the cam profiles 43', 45' drive the follower bearings 153, 157 attached to the cartridge shuttle 49 downward. The path constraint groove 35 now limits the movement of the shuttle to a direct vertical drop, and the shuttle lowers the tape cartridge into its loaded position on top of the tape drive motor. As the shuttle reaches the end of its linear travel, the cam profiles 43', 45' push the follower bearings 153, 157 to positions essentially as shown in FIGS. 10-A and 10-B.

The three loading cam profiles formed by the grooves 43, 45 lower the cartridge relatively evenly, to a position of flat engagement of the drive gear within the cartridge to the drive gear on the motor. However, because of the different dimensions of the cam follower bearings 153, 157 and the attendant different contours of the back edges 43", 45" of the grooves, the cam action during unloading is different on each side of the cartridge shuttle. Specifically, as the actuator arm 121 moves the conveyor 27 back toward the front of the drive (right to left in FIGS. 10-A, 10-B), the trailing edges 45" of the smaller grooves 45 in the left sidewall 41 engage the smaller diameter follower bearings 157 first. As such, the left wall of the conveyor 27 applies an upward force to the left side of the shuttle 49 before any upward force is applied to the right side of the shuttle. This produces a torque or twist on the cartridge 91, and the plane of the plate is not lifted in parallel to the plane of the magnet, so as to help separate the plate in the cartridge drive gear from the magnet in the motor drive gear. As the conveyor motion continues, the trailing edge 43" of the larger groove 43 in the right sidewall 37 engages the larger diameter follower bearing 153 to lift the right side of the shuttle. Further movement of the conveyor lifts the shuttle and cartridge along the path defined by the path constraint groove 35. Still further movement of the conveyor then moves the shuttle and cartridge laterally back toward the bezel opening as constrained by the groove 35, to complete the unloading operation.

FIG. 11 shows the base 9 and the loader assembly 11 of the tape drive 1 in an exploded view. This view also illustrates two aspects of the invention incorporated into the base 9.

First, the base 9 includes two load balancing springs 161. These springs engage the bottom surface of the tape cartridge shuttle, when the shuttle and cartridge are lowered into the fully loaded position. The lowering of the shuttle compresses the load balancing springs 161. The compressed springs apply an upward force to the shuttle. When the actuator begins to raise the shuttle, the spring forces assist in raising the shuttle and separating the plate in the cartridge drive gear from the magnet in the motor drive gear.

The springs 161 also create a force opposing lowering of the shuttle and cartridge into the final position. The cam profiles 43', 45' for loading include small regions 165 (see FIGS. 10-A, 10-B) to overcome this force. Specifically, each of these cam profiles includes a region 165 that extends adjacent the bend. Each region 165 has a low pressure angle. These regions of the cam profiles apply forces to the cam followers to overcome the highest reaction from the springs 161 after the magnetic attraction ends during lowering of the cartridge, e.g. after the metal plate engages the magnet. The camming by the regions 165 also overcomes pressure forces of the cantilevered springs 79 to separate the bottom plate of the shuttle from the lower surface of the cartridge.

FIG. 11 also shows two features extending upward from the base 9. Preferably, these extruded features 163 are substantially conical, with narrower ends upward. The features are located on the base to engage the holes 113 formed in the bottom of the cartridge 91 (FIG. 7-A). Registration of the conical features in the holes 113 serves to accurately align the tape cartridge in its lowermost position.

It may be helpful to consider the sequence of operations involved in loading a tape cartridge 91 into the tape drive 1. Initially, a user or an automated mechanism inserts the tape cartridge through a bezel opening (not shown) into the tape drive 1. Specifically, the cartridge 91 is inserted and pushed to the back of the cartridge shuttle 49. The extruded features 59 in left sidewall 57 of shuttle 49 push the cartridge to the right side of the shuttle 49. As the cartridge 91 is forwarded into the shuttle 49, bent feature 73 extending inwards from the back of the right sidewall 53 engages the tape-protecting door and slides the door toward the rear of the cartridge. This opens the door, exposing a leader pin attached to the end of the recording tape, making the pin accessible to a grabbing feature in the load arm assembly.

As the cartridge is pushed into the shuttle 49 and approaches its proper location, the flat springs 155 apply pressure and eventually the flat springs 155 engage notches in the lower edges of the cartridge. The front of the cartridge 91 also engages the stops 61. The cantilevered springs 79 apply downward pressure on the cartridge. The cartridge is now in a stable position for transport. The insertion of the cartridge also engages the cartridge-in sensor switch 69, which triggers the loader motor assembly 131.

The motor 133, gear reduction box, and gear train drive the worm gear 135 to rotate about its horizontal axis, and the worm gear 135 engages the teeth of the offset sector gear 129 to rotate the actuator arm 121 clockwise about the vertical pivot axis formed by the pin 127 and the opening 125 (see FIG. 8-A). As the actuator arm 121 rotates, the front edge 141' of groove 141 makes normal contact (90° pressure angle) with the follower bearing 33' attached to the top of the cartridge conveyor 27 (FIG. 9-A). The rotational movement of the arm 121 therefore produces a linear movement of the conveyor 27 back into the tape drive 1. During this movement, the guide 123 limits any upward movement of the distal end of the arm 121.

The linear motion of the conveyor 27 initially induces a linear motion of the tape cartridge shuttle assembly 47 along the path constraint groove 35 in the frame housing 13. However, after the cam follower bearing 153 attached to the tape cartridge shuttle 49 reaches the end of the horizontal portion of the groove 35, the inclined cam profiles 43', 45' formed in the side plates of the conveyor induce a downward vertical movement of the tape cartridge shuttle assembly 47.

As the shuttle lowers the cartridge, the conical features 163 on the base 9 (FIG. 11) engage the holes 113 in the bottom of the cartridge (FIG. 7-A), to accurately align the tape cartridge in its lowermost position. Also, the ring-shaped magnet 107 of the motor drive gear 105 exerts a magnetic attraction force on the metal plate 97 in the central drive gear 95 of the tape cartridge, to pull the teeth 99, 109 of these two gears into a positive mesh. The cantilevered springs 79 also provide downward pressure to help position the cartridge in full engagement with the motor and base, and those springs provide some vertical buffering of the cartridge in the fully engaged position with respect to the cartridge shuttle assembly 47.

The regions 165 of the cam profiles apply the final pressure on the shuttle to offset the upward forces created by the springs 161 and the cantilevered spring 79. The regions 165 apply sufficient force to continue movement of the shuttle 49, even after engagement of the gears and after the cartridge comes to rest. This continued downward motion of the shuttle achieves a small separation (e.g. 0.3 mm) between the lower plate 55 of the shuttle 49 and the bottom of the cartridge. The regions 165 have a low pressure angle and may be slightly curved, to achieve a high force for a short throw or travel of the conveyor 27 relative to the cam followers 153, 156 and the shuttle 49. The high force is needed to overcome the sum of the various spring forces.

After this lowering of the shuttle and the cartridge, the loader motor assembly 131 stops, and the movement of the actuator arm 121, the conveyor 27 and the shuttle assembly 47 stops. The tape cartridge is in the fully loaded position. The leader pin attached to the end of the magnetic tape within the cartridge is accessible through the open tape door. A grabbing feature of the load arm assembly (not shown) grabs the leader pin and draws the pin to the center of the take-up reel (also not shown). The data read/write process may now commence.

It also may be helpful to consider the sequence of operations involved in unloading a tape cartridge from the tape drive 1. A control signal causes the tape drive motor 101 to rewind the tape into the cartridge, and the leader pin is released from the take-up reel and the load arm assembly. A control signal is then applied to the loader motor assembly 131. This signal causes the motor 133, gear reduction box, and gear train drive the worm gear 135 to rotate in the opposite direction about its horizontal axis.

The magnetic attraction between the metal plate 97 and the magnet 107 creates a force opposing the initial lifting of the cartridge 91. This places a high torque requirement on the loader motor. The invention provides two different mechanisms to help offset this torque requirement. First, the compression springs 161 produce a force tending to separate the cartridge from the drive motor and thus to separate the plate 97 and the magnet 107 within the gears 99, 109. Second, the unloading cam profiles 43, 45 and the associated cam follower bearings 153, 157 are designed to twist the cartridge somewhat during initial lifting, so that the two planes of the plate 97 and the magnet 107 are not parallel, and thus are easier to separate.

Continuing with the discussion of the unloading operation, the worm gear 135 engages the teeth of the step-down sector gear 129 to now rotate the actuator arm 121 counterclockwise about the vertical pivot axis formed by the pin 127 and the opening 125 (FIG. 8-A). As the actuator arm 121 rotates, the back edge 141" of groove 141 makes normal contact (90° pressure angle) with the follower bearing 33' attached to the top of the cartridge conveyor 27 (FIG. 8-B). This rotational movement of the arm 121 therefore produces a linear movement of the conveyor 27 from the back of the tape drive 1 toward the front of the drive. The guide 123 prevents twisting of the arm 121 during rotation.

The forward linear motion of the conveyor 27 causes the trailing edges 45" of the smaller grooves 45 in the left sidewall 41 to engage the smaller diameter follower bearings 157 first (FIG. 10-A). This produces an upward force on the left side of the shuttle assembly 47 and the tape cartridge, causing a torque on the cartridge, to help separate the metal plate 97 in the cartridge drive gear 95 from the magnet 107 in the motor drive gear 105. To further assist in separation of the gears and overcoming the magnetic attraction, the two compression springs 161 on the base 9 apply upward forces to the bottom of the shuttle 49. As the linear movement of the conveyor 27 continues, the trailing edge 43" of the larger groove 43 in the right sidewall 37 engages the larger diameter follower bearing 153 to lift the right side of the shuttle 49 (FIG. 10B). Further movement of the conveyor 27 lifts the shuttle 49 and the cartridge 91 along the path defined by the path constraint groove 35. Still further movement of the conveyor then moves the shuttle and cartridge laterally back toward the bezel opening as constrained by the groove 35. When the conveyor 27 and the shuttle assembly reach the end of their range of travel toward the front of the drive, the cam follower 153 trips the home position switch 151, and operation of the motor 133 stops. At this point, the motion of the actuator arm 121, the conveyor 27 and the shuttle assembly 47 stop, and the cartridge 91 is accessible through the bezel opening so as to allow a user or a mechanism to withdraw the cartridge.

As shown by the drawings and the above discussion, the automatic tape cartridge loader mechanism of the present invention provides an effective system for loading and unloading cartridges, while minimizing the space occupied by the loader. The loader illustrated in the drawings is only slightly larger than the tape cartridge itself. For example, the actuator arm on the top of the loader is substantially flat, and as such, the actuator arm and associated components require relatively little additional space above the top of the frame housing, i.e. minimizing the height of the loader. The off-set of the sector gear allows use of a motor and worm gear having a very low profile.

The inventive cam follower and profile arrangement together with the compression springs between the base and the shuttle assist in separating the gears, overcoming magnetic forces of engagement thereby, reducing torque requirements during unloading. The springs, the cam followers and the profiles, however, require minimal space within the design envelopes of the drive and its loader mechanism. Also, these components tend to be simple, cheap to manufacture and durable.

The inventive tape loader has proven to be quite durable and has a long service life. A loader mechanism in accord with the invention was designed for a useful life of at least 300,000 loading/unloading cycles. An actual test unit has completed over 1,500,000 cycles without jam or failure and has exhibited virtually no component wear.

Those skilled in the art will recognize that the present invention admits of a number of modifications, within the spirit and scope of the inventive concepts. While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. An automatic tape cartridge loader, for loading a tape cartridge into a tape drive for reading and writing of data on a tape within the cartridge, the tape loader comprising:

a moveable tape cartridge conveyor for receiving the tape cartridge and moving the tape cartridge into operative engagement with the tape drive;

a pivotally mounted substantially flat actuator an, the actuator arm extending substantially in a plane from a pivotal axis to a distal end, the pivotal axis being substantially perpendicular to the plane;

a step-down sector gear, stepped-down from the plane of the substantially flat actuator arm, about a section of the outer periphery of the actuator arm about the pivotal axis, a centerline of the sector gear being offset from the plane of the actuator arm;

a drive system having an automatically driven gear in engagement with the sector gear to induce rotational movement of the actuator arm about the pivotal axis; and a coupling connected between the actuator arm and the cartridge conveyor, for converting the rotational movement of the actuator arm to an operative movement of the cartridge conveyor.

2. An automatic tape cartridge loader as in claim 1, wherein the coupling comprises a groove formed through the actuator arm and a cam follower attached to the cartridge conveyor and positioned within the groove such that the cam follower engages at least one edge of the groove during the rotational movement of the actuator arm.

3. An automatic tape cartridge loader as in claim 1, wherein the step-down sector gear extends through an arc of approximately 90° along the peripheral section of the actuator arm about the pivotal axis.

4. An automatic tape cartridge loader as in claim 3, wherein a portion of the arc along the peripheral section extends directly opposite the distal end of the actuator arm with respect to the pivotal axis.

5. An automatic tape cartridge loader as in claim 1, wherein the centerline of the sector gear is offset from the plane of the actuator arm such that teeth of the sector gear do not cross the plane of the actuator arm.

6. An automatic tape cartridge loader as in claim 5, wherein the step-down sector gear extends beyond a plane of a major surface of the actuator arm.

7. An automatic tape cartridge loader, for loading a tape cartridge into a tape drive for reading and writing of data on a tape within the cartridge, the tape loader comprising:
   a moveable tape cartridge conveyor for receiving the tape cartridge and moving the tape cartridge into operative engagement with the tape drive;
   a pivotally mounted substantially flat actuator arm, the actuator arm extending substantially in a plane from a pivotal axis to a distal end, the pivotal axis being substantially perpendicular to the plane;
   a step-down sector gear attached along a peripheral section of the actuator arm about the pivotal axis, a centerline of the sector gear being offset from the plane of the actuator arm;
   a drive system having an automatically driven gear in engagement with the sector gear to induce rotational movement of the actuator arm about the pivotal axis;
   a coupling connected between the actuator arm and the cartridge conveyor, for converting the rotational movement of the actuator arm to an operative movement of the cartridge conveyor; and
   a guide member adjacent the distal end of the actuator arm for preventing twisting of the actuator arm during rotational movement of the actuator arm.

8. An automatic tape cartridge loader as in claim 7, wherein the guide comprises a stationary member having a substantially flat section extending over the distal end of the actuator arm as the distal end travels during rotational movement of the actuator arm.

9. An automatic tape cartridge loader as in claim 7, further comprising a frame and a pivot pin fixedly attached to the frame, wherein the frame moveably supports the tape cartridge shuttle, the frame fixedly supports the guide, and the actuator arm is mounted for rotation about the pivot pin.

10. An automatic tape cartridge loader for use in a data tape drive, the loader comprising:
    a frame housing for the loader;
    a conveyor for receiving a tape cartridge, the conveyor being mounted within the frame housing so as to enable at least a linear motion in at least one direction of the conveyor relative to the frame housing;
    a cam follower bearing attached to the conveyor and arranged for linear motion relative to the frame housing;
    a substantially flat actuator arm coupled to the frame housing for rotation about an axis fixed in relation to the frame housing;
    a step-down sector gear attached to extend away from a section of the outer periphery of the substantially flat actuator arm and to rotate about the axis with the arm, a centerline of the sector gear being offset from a plane of the actuator arm;
    a groove through a portion of the actuator arm at a distance from the axis, at least one edge of the groove forming a cam profile of a predetermined shape providing a substantially perpendicular contact to the cam follower bearing during the rotation of the actuator arm; and
    a motor driven gear coupled to the step-down sector gear for driving the rotation of the actuator arm about the axis.

11. An automatic tape cartridge loader as in claim 10, wherein:
    the groove comprises front and back edges forming the cam profile and another cam profile,
    the front edge providing direct contact with the cam follower bearing during loading of the tape cartridge, and
    the back edge providing direct contact with the cam follower bearing during unloading of the tape cartridge.

12. An automatic tape cartridge loader as in claim 11, wherein the direct contact by the front edge and the direct contact by the back edge are substantially perpendicular to a circumference of the cam follower bearing.

13. An automatic tape cartridge loader as in claim 10, further comprising:
    a cartridge shuttle for receiving the tape cartridge, the shuttle being mounted for movement within the conveyor; and
    at least one cam profile on the conveyor and at least one cam follower bearing attached to the cartridge shuttle and interacting with the at least one cam profile, for inducing a two dimensional movement of the cartridge shuttle in response to linear motion of the conveyor.

14. An automatic tape cartridge loader as in claim 10, wherein the motor driven gear system comprises a worm gear engaged with the step-down sector gear in such a manner that rotation of the worm gear moves the sector gear to induce the rotation of the actuator arm.

15. An automatic tape cartridge loader as in claim 10, wherein the centerline of the sector gear is offset from the plane of the actuator arm such that teeth of the sector gear do not cross the plane of the actuator arm, and the teeth of the sector gear extend beyond a plane of a major surface of the actuator arm.

16. An automatic tape cartridge loader, for use in a data tape drive, the loader comprising:
    a frame housing for the loader;
    a conveyor for receiving a tape cartridge, the conveyor being mounted within the frame housing so as to enable at least a linear motion in at least one direction of the conveyor relative to the frame housing;
    a cam follower bearing attached to the conveyor and arranged for linear motion relative to the frame housing;
    a substantially flat actuator arm coupled to the frame housing for rotation about an axis fixed in relation to the frame housing;
    a step-down sector gear attached along a peripheral section of the substantially flat actuator arm about the axis, a centerline of the sector gear being offset from a plane of the actuator arm;

a groove through a portion of the actuator arm at a distance from the axis, at least one edge of the groove forming a cam profile of a predetermined shape providing a substantially perpendicular contact to the cam follower bearing during the rotation of the actuator arm;

a motor driven gear coupled to the step-down sector gear for driving the rotation of the actuator arm about the axis; and a torsion spring attached to the actuator arm for biasing the cam follower bearing within the groove of the actuator arm.

17. An automatic tape cartridge loader, for use in a data tape drive, the loader comprising:

a frame housing for the loader;

a conveyor for receiving a tape cartridge, the conveyor being mounted within the frame housing so as to enable at least a linear motion in at least one direction of the conveyor relative to the frame housing;

a cam follower bearing attached to the conveyor and arranged for linear motion relative to the frame housing;

a substantially flat actuator arm coupled to the frame housing for rotation about an axis fixed in relation to the frame housing;

a step-down sector gear attached along a peripheral section of the substantially flat actuator arm about the axis, a centerline of the sector gear being offset from a plane of the actuator arm;

a groove through a portion of the actuator arm at a distance from the axis, at least one edge of the groove forming a cam profile of a predetermined shape providing a substantially perpendicular contact to the cam follower bearing during the rotation of the actuator arm;

a motor driven year coupled to the step-down sector gear for driving the rotation of the actuator arm about the axis; and a guide plate fixedly attached to the frame housing, wherein a radial end of the actuator arm adjacent the groove moves between a surface of the frame housing and the guide plate during rotation of the actuator arm.

18. An automatic tape cartridge loader as in claim 17, wherein the guide plate comprises a substantially flat section extending over the radial end of the actuator arm as the radial end travels during rotational movement.

19. An automatic tape cartridge loader, for use in a data tape drive, the loader comprising:

a frame housing for the loader;

a conveyor for receiving a tape cartridge, the conveyor being mounted within the frame housing so as to enable at least a linear motion in at least one direction of the conveyor relative to the frame housing;

a cam follower bearing attached to the conveyor and arranged for linear motion relative to the frame housing;

a substantially flat actuator arm coupled to the frame housing for rotation about an axis fixed in relation to the frame housing;

a step-down sector gear attached along a peripheral section of the substantially flat actuator arm about the axis, a centerline of the sector gear being offset from a plane of the actuator arm;

a groove through a portion of the actuator arm at a distance from the axis, at least one edge of the groove forming a cam profile of a predetermined shape providing a substantially perpendicular contact to the cam follower bearing during the rotation of the actuator arm;

a motor driven gear coupled to the step-down sector gear for driving the rotation of the actuator arm about the axis; and a torsion spring attached to the actuator arm for biasing the cam follower bearing within the groove of the actuator arm, wherein the torsion spring has an elongated arm for contact with the cam follower bearing, the cam follower bearing moves along the arm of the torsion spring during movement of the actuator arm, and a contour of the arm is such that pressure by the spring on the cam follower bearing remains substantially perpendicular to a circumference of the cam follower bearing during the movement of the actuator arm.

20. An automatic tape cartridge loader, comprising:

loader means for receiving the tape cartridge and in response to a linear actuation moving the cartridge into operative engagement with a data tape drive; and a substantially flat actuator arm mounted for pivotal motion and coupled to the loader means such that pivotal motion of the actuator arm imparts the linear actuation to the loader means, the actuator arm comprising a step-down sector gear for rotating the actuator arm in response to a drive gear force applied through the sector gear.

* * * * *